(12) United States Patent
Chang

(10) Patent No.: US 7,673,947 B2
(45) Date of Patent: Mar. 9, 2010

(54) QUICK RELEASE DEVICE WITH BIASING UNIT

(76) Inventor: Chin-Chao Chang, No. 293, Yongfong Rd., Taiping City, Taichung County 411 (TW)

( * ) Notice: Subject to any disclaimer, the term of this patent is extended or adjusted under 35 U.S.C. 154(b) by 21 days.

(21) Appl. No.: 11/983,308

(22) Filed: Nov. 8, 2007

(65) Prior Publication Data

US 2009/0121538 A1  May 14, 2009

(51) Int. Cl.
 *B60B 37/00* (2006.01)
(52) U.S. Cl. .................................. 301/124.2
(58) Field of Classification Search ............. 301/124.2, 301/110.5–110.6; 280/279; 403/109.5, 314, 403/DIG. 4
See application file for complete search history.

(56) References Cited

U.S. PATENT DOCUMENTS 5,961,186 A * 10/1999 Phillips .................... 301/124.2
6,241,322 B1 * 6/2001 Phillips .................... 301/124.2
7,090,308 B2 * 8/2006 Rose et al. ............... 301/110.5

* cited by examiner

*Primary Examiner*—Jason R Bellinger
(74) *Attorney, Agent, or Firm*—Charles E. Baxley

(57) ABSTRACT

A quick release device includes a cam portion and a lever connected to the cam portion, a cooperation unit with which the cam portion is pivotably engaged, a rod having a first threaded section at a first end thereof and the threaded section extending through the cooperation unit and into the cam portion and threadedly connected with a pin which transversely extends through the cam portion, a second end of the rod including a second threaded section which extends through a biasing unit and is connected with an adjustment member in the biasing unit. The biasing unit pulls rod in a direction away from the operation member. The biasing unit is a tubular member which accommodates the spring and the adjustment member therein.

7 Claims, 8 Drawing Sheets

QUICK RELEASE DEVICE WITH BIASING UNIT

FIELD OF THE INVENTION

The present invention relates to a quick release device with a biasing unit which keeps the items that to be secured from being loosened during operation of the quick release device.

BACKGROUND OF THE INVENTION

A conventional quick release device for connecting the axle 2 of a front wheel to the two legs 21 of front fork or for connecting the axle of a rear wheel to the chain stays is shown in FIG. 1 and generally includes an operation member 1 which is composed of a lever 15 and a cam portion 16 which includes a curved periphery 17. A rod 11 has one end connected to the cam portion 16 and the other end of the rod 11 extends through a cooperation unit 12, one of the legs 21 of the front fork, the axle 2 of the front wheel, the other leg of the front fork and is threadedly connected with a nut 13 by a threaded section 14 of the rod 11. Each leg 21 of the front fork includes a recessed area 23 defined in an outside thereof so as to receive the cooperation unit 12 and the nut 13 when the quick release device secures the parts mentioned above. The two legs 21 of the front fork each have an open end 22 in which the rod 11 is engaged, and the user operates the operation member 1 to lock the quick release device. However, the rod 11 is easily disengaged from the two open ends 22 of the two legs 21 before pivoting the operation member 1 because there is no proper positioning device to locate the legs 21 and the rod 11.

An improved quick release device is disclosed as shown in FIG. 2, wherein a biasing unit 3 is added to the conventional quick release device as shown in FIG. 1 and located between the leg 21 and the cooperation unit 12. The biasing unit 3 includes a cup 31 and a spring 32 which has one end contacting an inside of the cup 31 and the other end is in contact with the cooperation unit 12. The spring 32 applies a force to pull the rod 11 before the operation member 1 is pivoted such that the leg 21 can be clamped between the axle 2 and the biasing unit 3. This improves the shortcoming of the conventional quick release device as shown in FIG. 1. Nevertheless, the biasing unit 3 is exposed and easily contaminated by mud and dust. The spring 32 might jump out from the opened end of the cup 31 when assembling the quick release device.

The present invention intends to provide a quick release device with a biasing unit which is a tubular combination so as to protect the spring therein from mud and dust.

SUMMARY OF THE INVENTION

The present invention relates to a quick release device which comprises an operation member composed of a cam portion and a lever connected to the cam portion. A cooperation unit is located at one end of the axle of the wheel and the cam portion is pivotably engaged. A rod has a first threaded section at a first end thereof and the first threaded section extends through the cooperation unit and into the cam portion and is threadedly connected with a pin which transversely and eccentrically extends through the cam portion. A second end of the rod includes a second threaded section which extends through the axle of the wheel and a biasing unit and is connected with an adjustment member in the biasing unit. The biasing unit pulls rod in a direction away from the operation member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
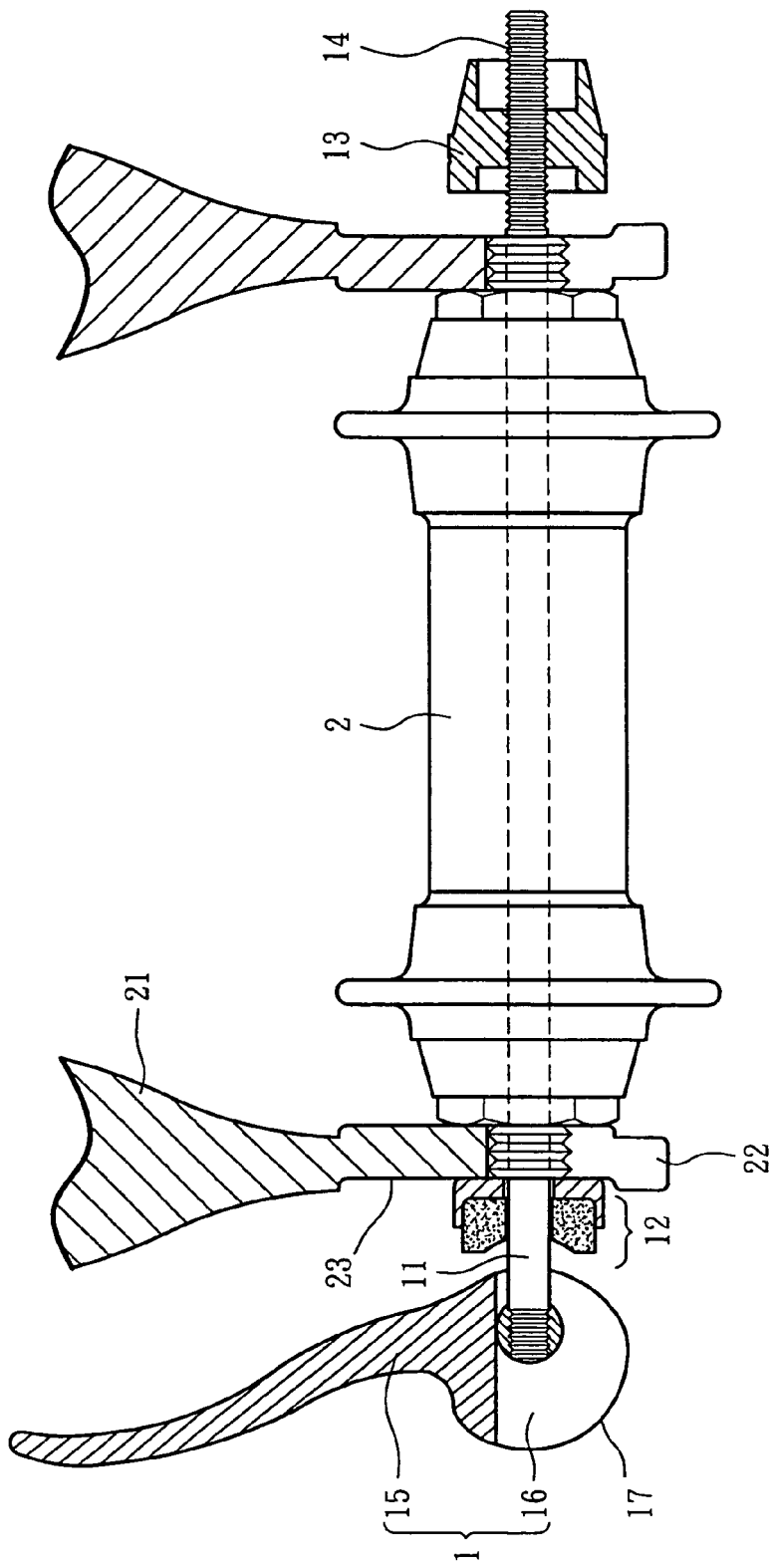
FIG. 1 is a partial cross sectional view to show a first conventional quick release device.
Figure 2:
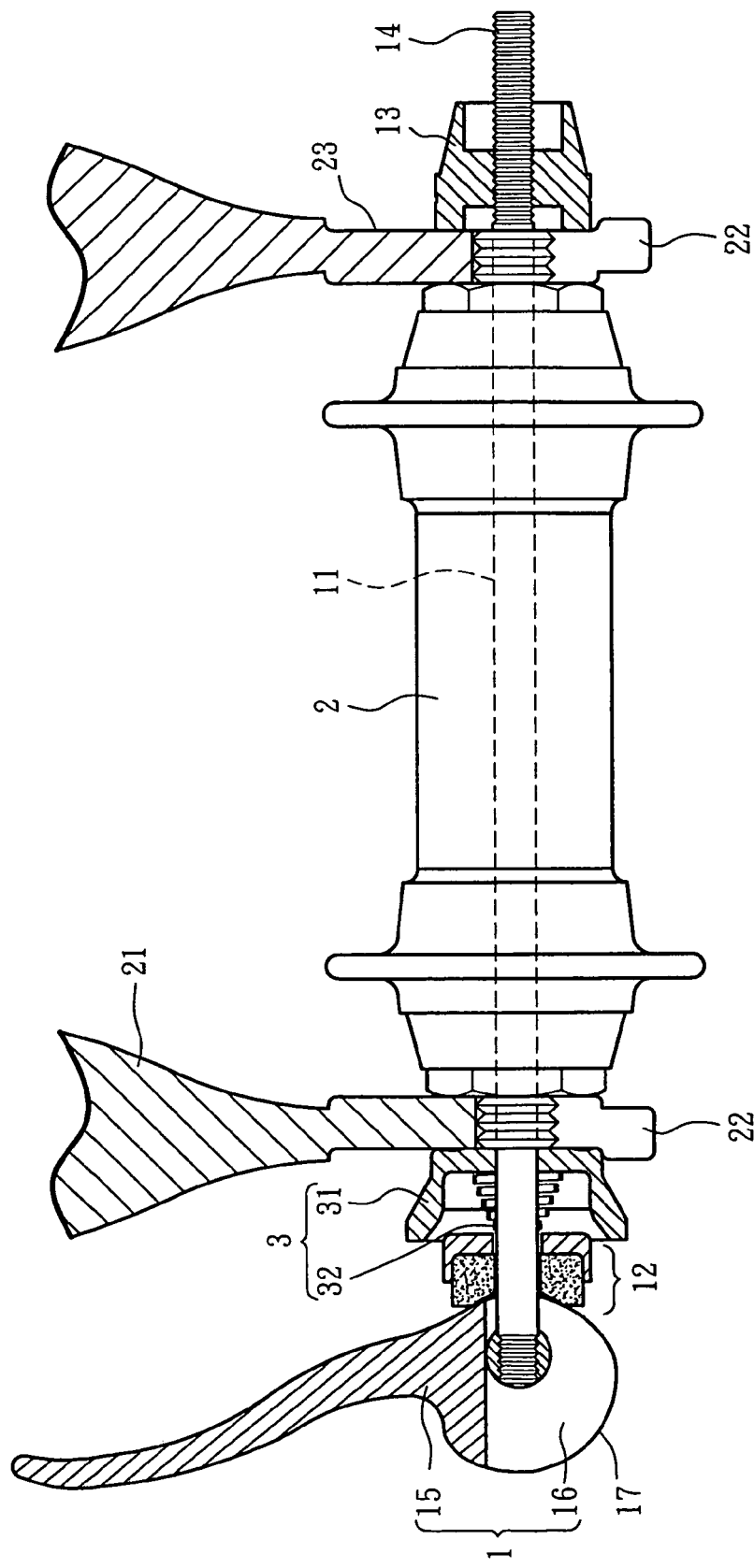
FIG. 2 is a partial cross sectional view to show a second conventional quick release device.
Figure 3:
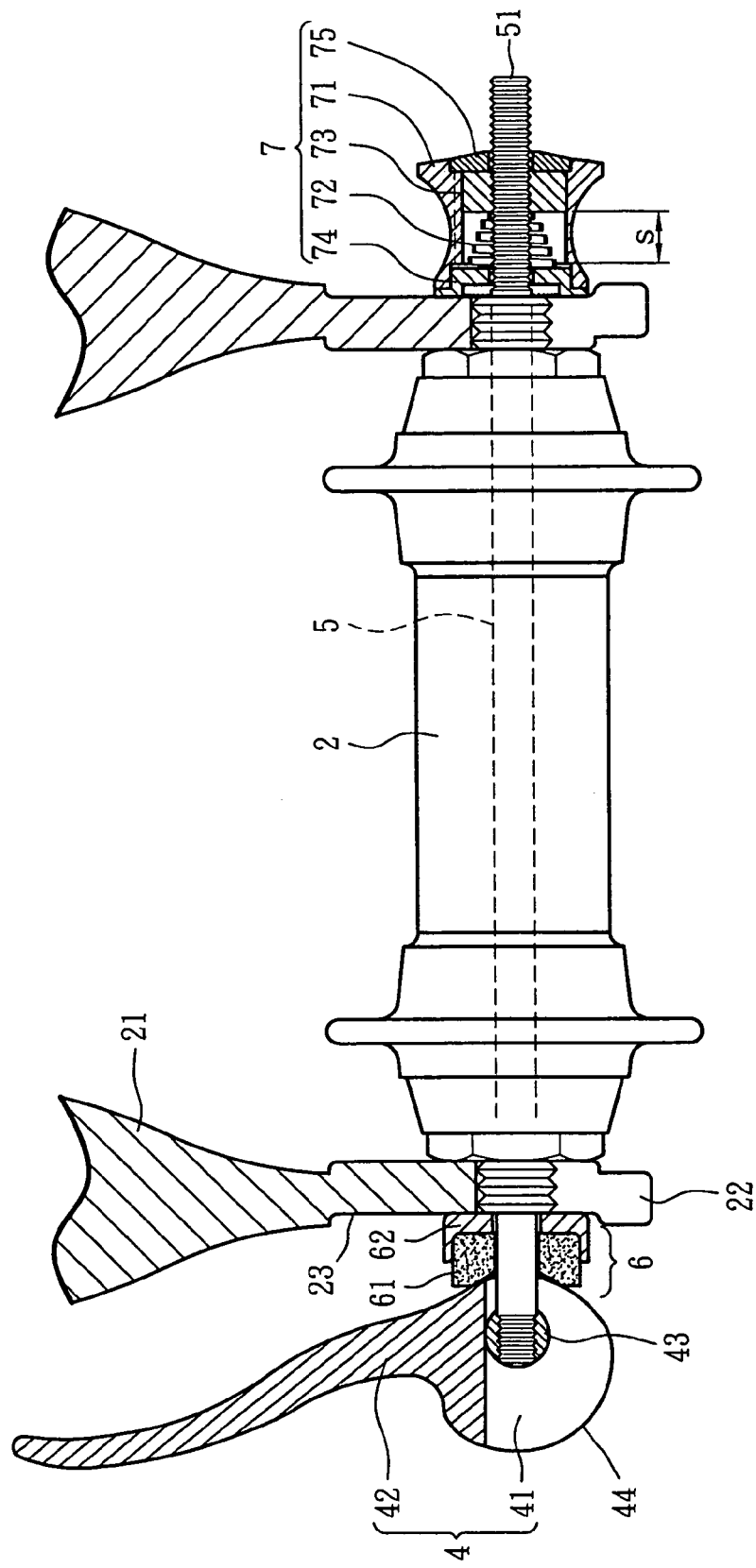
FIG. 3 is a partial cross sectional view to show the quick release device of the present invention which secures the axle of a wheel between two legs of front fork.
Figure 4:
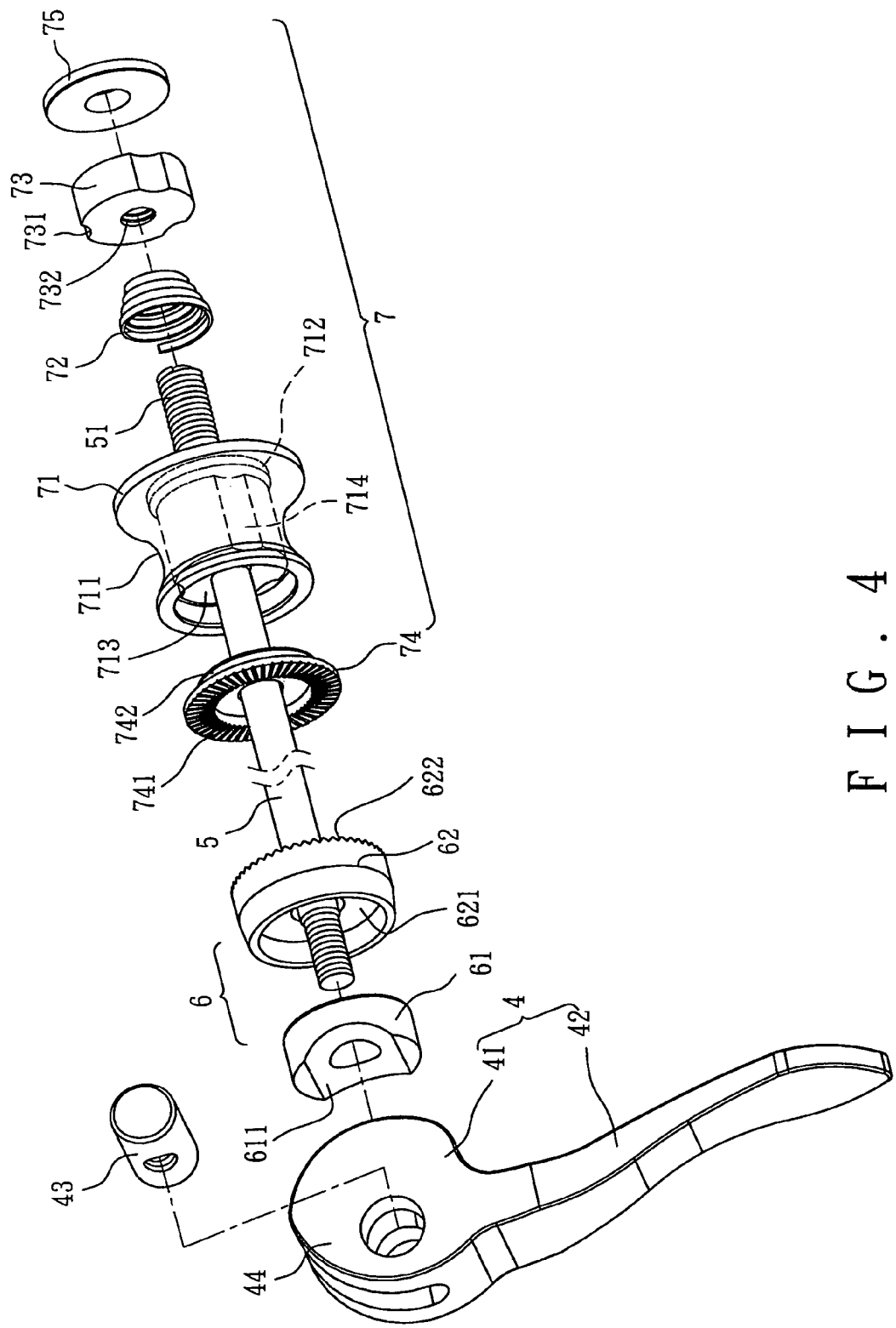
FIG. 4 is an exploded view to show the quick release device of the present invention.
Figure 5:
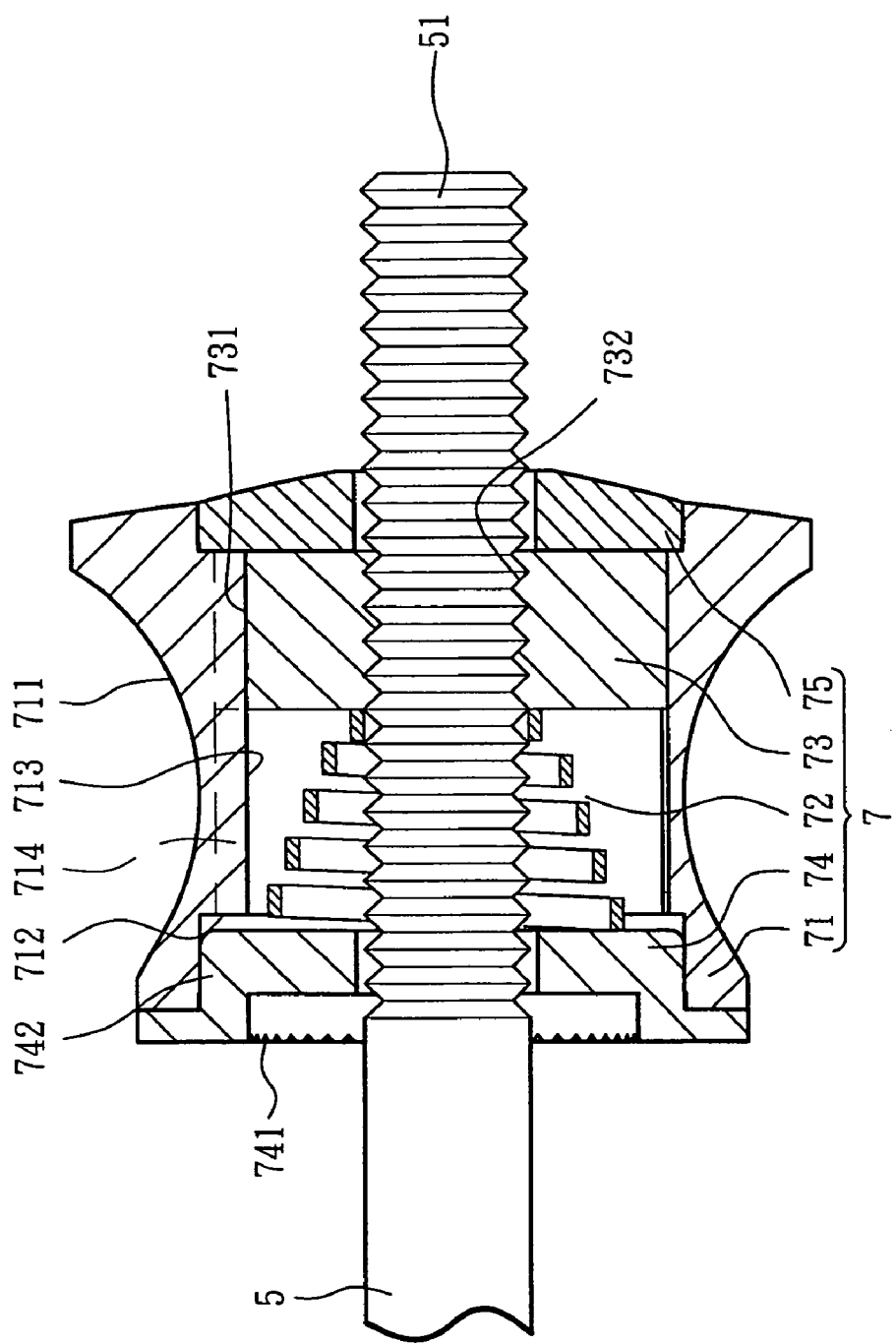
FIG. 5 is a cross sectional view to show the biasing unit of the quick release device of the present invention.

Referring to FIGS. 3 to 5, the quick release device of the present invention comprises an operation member 4 which is composed of a cam portion 41 and a lever 42 connected to the cam portion 41. The cam portion 4 includes two parallel portions and each portion includes a cam-shaped profile 44. A through hole is defined through the two parallel portions of the cam portion 41 and located eccentrically in the cam portion 41.

A cooperation unit 6 includes a pad 61 with a curved and concaved recess 611 and a cup 62 which has a receiving space 621 defined in one end thereof and the other of the cup 62 formed with a toothed surface 622. The cam portion 41 is pivotally engaged with the curved and concaved recess 611 of the pad 61. The cooperation unit 6 is located at an end of the hub 2 of a front wheel (for example). The toothed surface 622 of the cup 62 of the cooperation unit 6 is engaged with one of the two legs of the front fork.

A rod 5 has a first threaded section at a first end thereof and the first threaded section extends through the cooperation unit 6 and into the cam portion 41 and is threadedly connected with a pin 43 which is located in the through hole in the cam portion 41. A second end of the rod 5 includes a second threaded section 51 which extends through the hub 2 and a biasing unit 7 and is connected with an adjustment member 73 in the biasing unit 7. The biasing unit 7 is located at the other end of the hub 2 and longitudinally pulls the rod 5 away the operation member 4. The biasing unit 7 includes a tubular case 71 and a contact member 74 is engaged with a first end of the case 71 and includes a toothed surface 741 on one end and an insertion portion 742 on the other end of the contact member 74. The tooth surface 741 of the contact member 74 in engaged with the other one of the two legs 21 of the front fork.

The case 71 includes a passage 713 centrally and longitudinally defined therethrough. The first end of the case 71 has a diameter smaller than a diameter of a second end of the case of the biasing unit 7. The case 71 includes a curved outer periphery 711 such that the user can easily hold the case 71.

Each of the first and second ends of the case 71 includes a recess 712, the insertion portion 742 of the contact member 74 is engaged with the recess 712 in the first end of the case 71 and an end piece 75 is engaged with the recess 712 in the second end of the case 71 so as to seal the second end of the case 71. A spring is mounted to the rod 5 and received in the passage 713. An adjustment member 73 includes an outer periphery which is complementary to the passage 713 and a threaded hole 732 is centrally defined through the adjustment member 73. The adjustment member 73 is received in the passage 713 and the threaded section 51 of the rod 5 threadedly extends through the threaded hole 732 and extend through the end piece 75. The spring 72 is in contact between the contact member 74 and the adjustment member 73. Three ribs 714 extend axially and inward from an inner periphery of the passage 713 and the adjustment member 73 includes three grooves 731 defined in the outer periphery thereof, the ribs 714 are slidably engaged with the grooves 731. Therefore, when rotating the case 71, the adjustment member 73 is rotated with the case 71 and moves along the second threaded section 51 to compress the spring 72.

Figure 6:
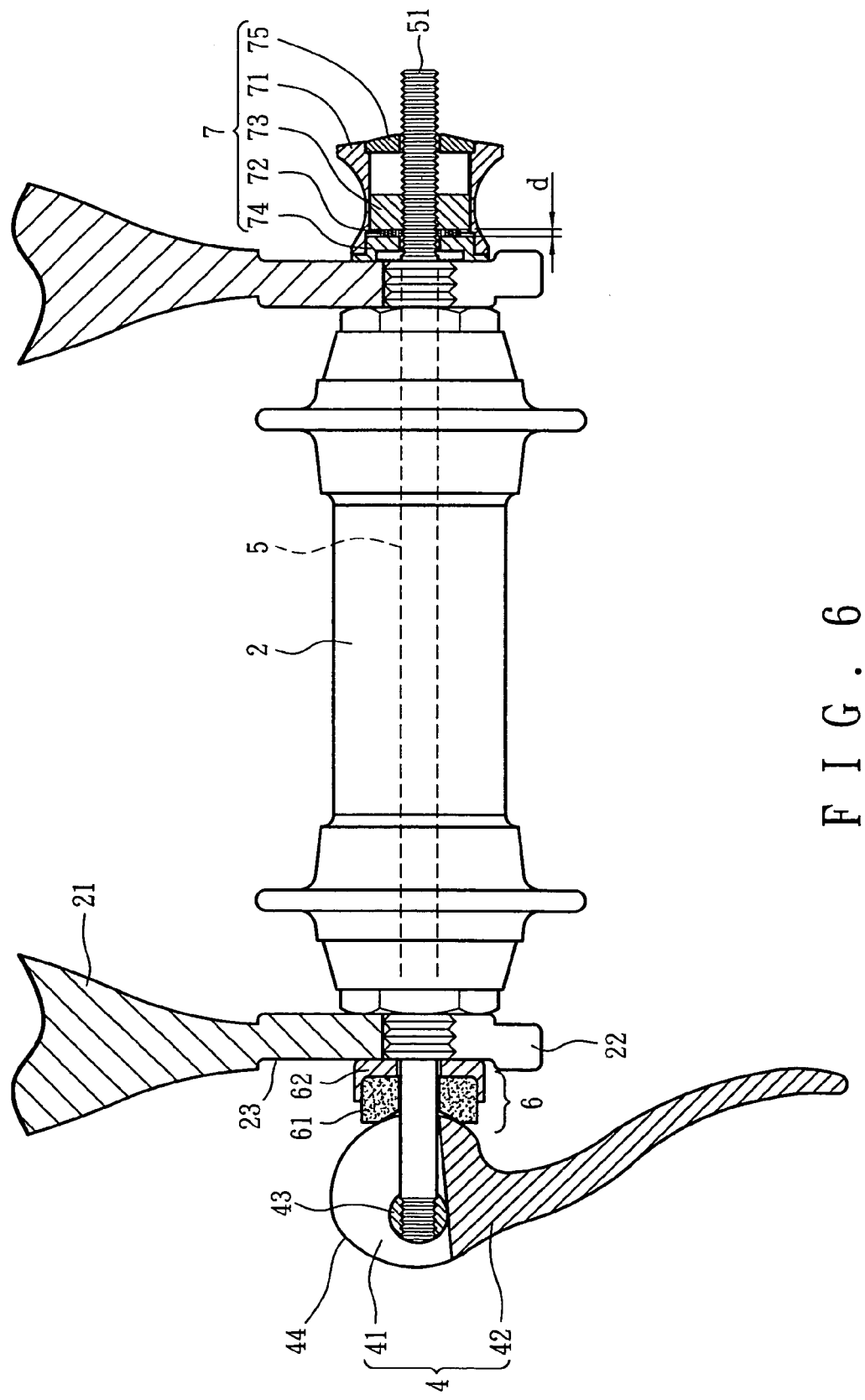
FIG. 6 is a partial cross sectional view to show the quick release device of the present invention which secures the axle of a wheel between two legs of front fork, wherein the spring in the biasing unit is compressed.

As shown in FIG. 6, when securing the hub 2 between the two legs 21 of the front fork, the biasing unit 7 applies a pull force to the rod 5 which pulls the operation member 4 toward the rod 5 so that the two legs 21 and the hub 2 are easily positioned before the operation member 4 is pivoted. The case 71 can be rotated to compress the spring 72 by the adjustment member 73 and the length of the spring 72 is changed from "s" as shown in FIG. 3 to "d" as shown in FIG. 6 to provide a strong pull force to the rod 5.

Figure 7:
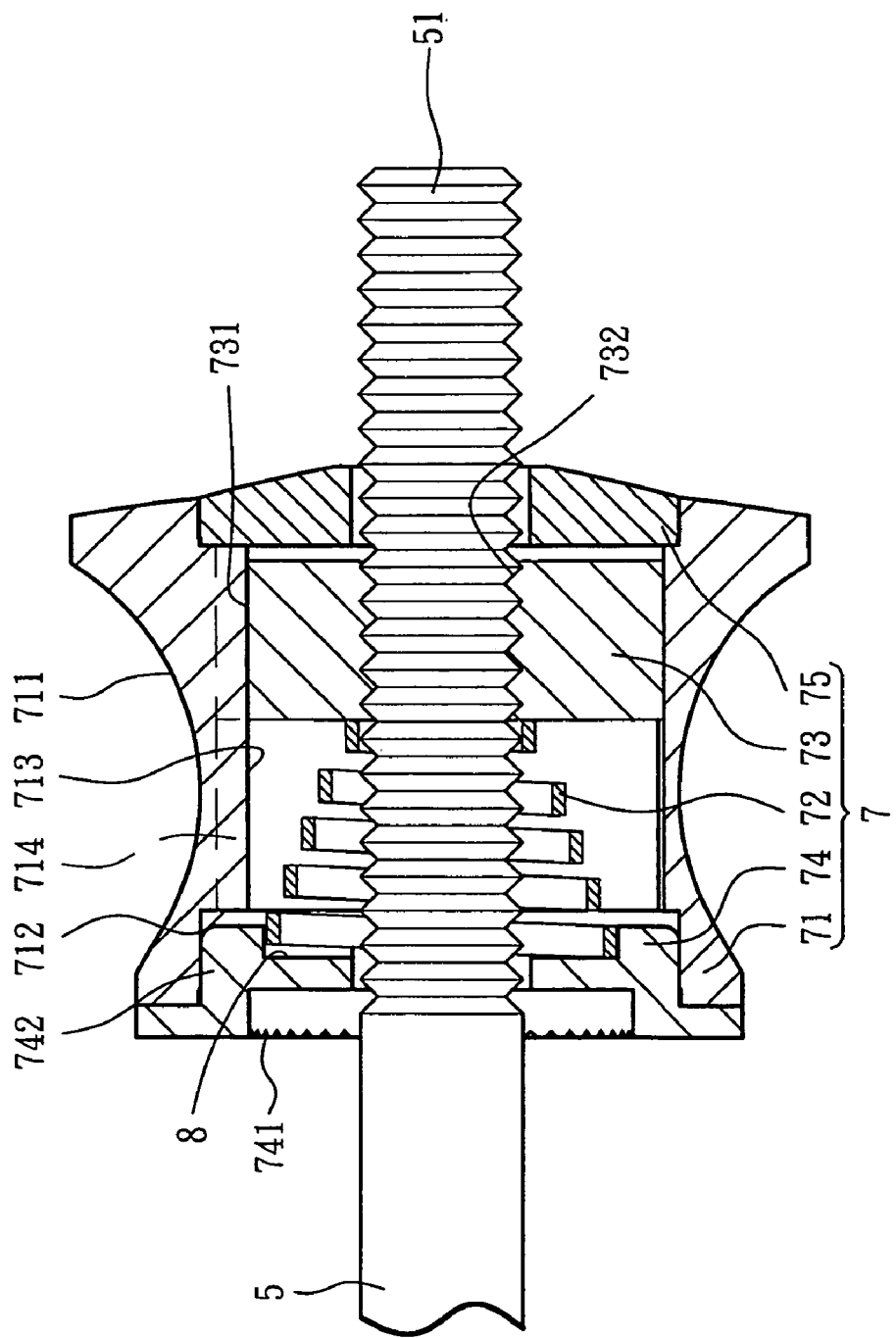
FIG. 7 shows a concavity is defined in the insertion of the contact member to receive the spring.
Figure 8:
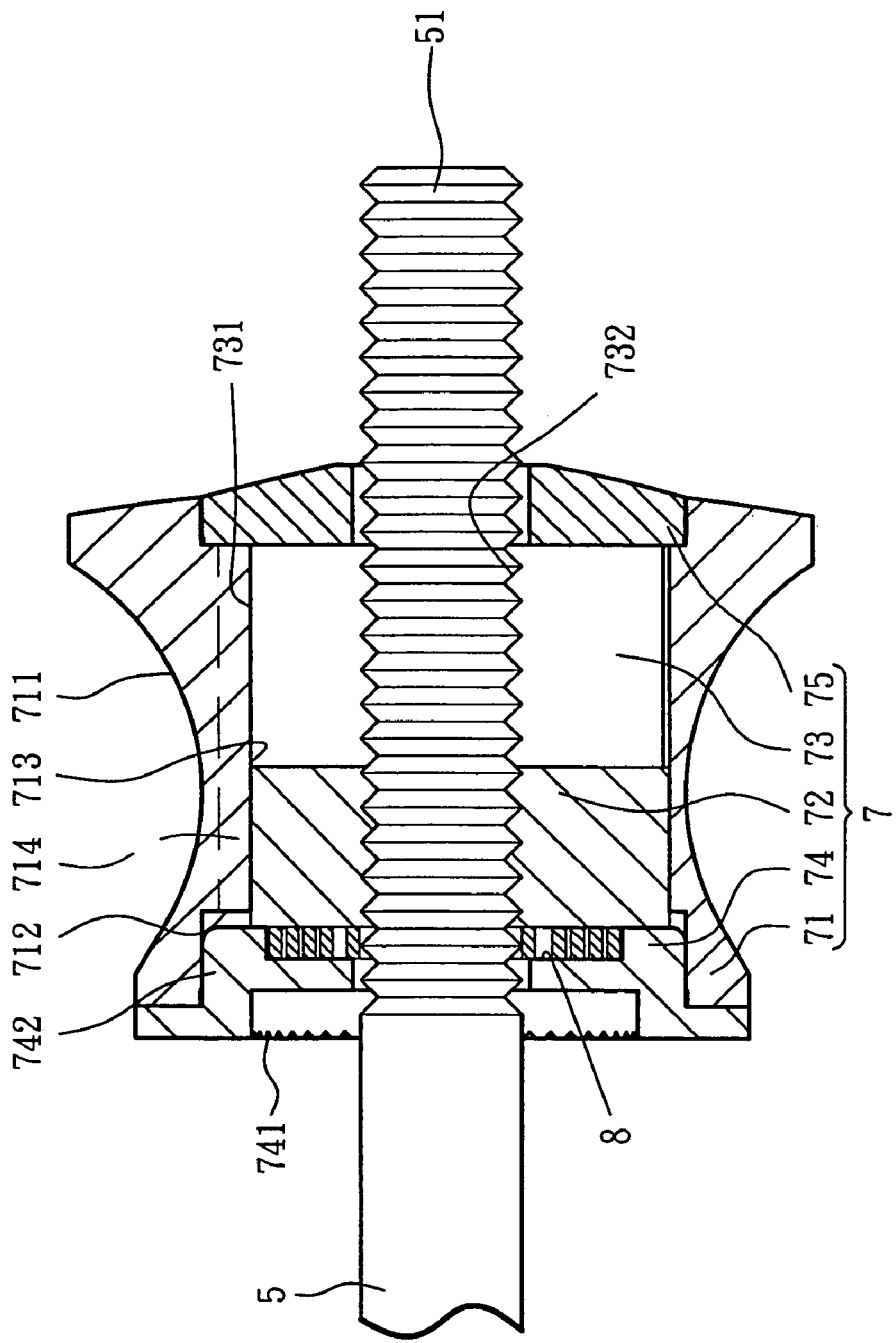
FIG. 8 shows the spring is received in the concavity.

FIG. 7 and FIG. 8 shown that the insertion portion 742 of the contact member 74 may includes a concavity 8 which receives an end if the spring 72.

While we have shown and described the embodiment in accordance with the present invention, it should be clear to those skilled in the art that further embodiments may be made without departing from the scope of the present invention.

What is claimed is:

1. A quick release device comprising:
an operation member composed of a cam portion and a lever connected to the cam portion;
a cooperation unit which includes a pad with a curved and concaved recess with which the cam portion is pivotally engaged;
a rod having a first threaded section at a first end thereof and the first threaded section extending through the cooperation unit and into the cam portion and is threadedly connected with a pin which transversely and eccentrically extends through the cam portion, a second end of the rod including a second threaded section which extends through a biasing unit and is connected with an adjustment member in the biasing unit, the biasing unit longitudinally pulling the rod away from the operation member, the biasing unit including a tubular case which includes a passage centrally and longitudinally defined therethrough, the contact member engaged with a first end of the case and a spring mounted to the rod and received in the passage, the adjustment member including an outer periphery which is complementary to the passage and a threaded hole centrally defined through the adjustment member, the adjustment member slidably received in the passage and the threaded section of the rod threadedly extending through the threaded hole such that adjustment member is rotated with the case and moves along the threaded section of the rod to compress the spring when rotating the case, the spring being in contact between the contact member and the adjustment member.

2. The device as claimed in claim 1, wherein the biasing unit includes a contact member which includes a toothed surface which is adapted to be engaged with one of two legs of a front fork.

3. The device as claimed in claim 1, wherein each of the first and second ends of the case includes a recess, the contact member includes an insertion which is engaged with the recess in the first end of the case, the end piece is engaged with the recess in the second end of the case.

4. The device as claimed in claim 1, wherein the case includes a curved outer periphery.

5. The device as claimed in claim 1, wherein at lease one rib extends axially and inward form an inner periphery of the passage and the adjustment member includes at least one groove defined in the outer periphery thereof, the at least one rib is slidably engaged with the at least one groove.

6. The device as claimed in claim 1, wherein the first end of the case has a diameter smaller than a diameter of the second end of the case of the biasing unit.

7. The device as claimed in claim 2, wherein the insertion portion of the contact member includes a concavity which receives an end of the spring.

* * * * *